(12) United States Patent
Hamlyn et al.

(10) Patent No.: US 11,585,914 B2
(45) Date of Patent: Feb. 21, 2023

(54) SYSTEM AND METHODS FOR GENERATING AND RECEIVING DOPPLER TOLERANT MULTIPURPOSE COMMUNICATION WAVEFORM

(71) Applicant: The Mitre Corporation, McLean, VA (US)

(72) Inventors: Perry F. Hamlyn, Tewksbury, MA (US); William A. Dowling, Chelmsford, MA (US); Charles Mazzola, Attleboro, MA (US)

(73) Assignee: The MITRE Corporation, McLean, VA (US)

( * ) Notice: Subject to any disclaimer, the term of this patent is extended or adjusted under 35 U.S.C. 154(b) by 0 days.

(21) Appl. No.: 17/410,688

(22) Filed: Aug. 24, 2021

(65) Prior Publication Data

US 2022/0214438 A1 Jul. 7, 2022

Related U.S. Application Data

(63) Continuation of application No. 16/418,424, filed on May 21, 2019, now Pat. No. 11,099,265.

(Continued)

(51) Int. Cl.
*H04J 14/02* (2006.01)
*G01S 13/28* (2006.01)
(Continued)

(52) U.S. Cl.
CPC .......... *G01S 13/282* (2013.01); *G01S 13/584* (2013.01); *H04B 1/69* (2013.01); *H04L 5/0007* (2013.01);
(Continued)

(58) Field of Classification Search
CPC ...... G01S 13/931; G01S 13/343; G01S 13/34; G01S 13/584; G01S 7/35; G01S 7/352; G01S 13/42; G01S 7/356; G01S 7/032; H04B 2001/6912; H04B 1/69; H04B 1/7073; H04B 1/7075; H04B 1/7087; H04B 10/40; H04B 2001/0408; H04B 7/0413;
(Continued)

(56) References Cited

U.S. PATENT DOCUMENTS 11,054,498 B2 * 7/2021 Brett ................. G01S 13/583
2009/0290658 A1 * 11/2009 Moore ................. H04L 27/12
375/295

(Continued)

*Primary Examiner* — Eva Y Puente
(74) *Attorney, Agent, or Firm* — Morrison & Foerster LLP (57) ABSTRACT

A system and method for generating communications waveforms that can operate in congested frequency spaces and in applications in which the receiver is moving with respect to the transmitter is provided. In one or more examples, each symbol to be encoded and transmitted is converted into a sequence of frequency chirps. The sequence of frequencies used by the sequence of chirps is based on the symbol that is to be encoded. Each chirp can have a center frequency, and the frequency can be swept over the duration of the chirp. In this way each chirp can have a varying frequency over the duration of the chirp, but the phase of the chirp can be continuous throughout the duration of the chirp. The bandwidth and sweep rate of the chirp can be based on the expected maximum velocity of the receiver and the transmitter relative to one another.

24 Claims, 8 Drawing Sheets

Related U.S. Application Data

(60) Provisional application No. 62/829,921, filed on Apr. 5, 2019.

(51) Int. Cl.
  *G01S 13/58* (2006.01)
  *H04L 5/00* (2006.01)
  *H04B 1/69* (2011.01)
  *G06F 12/02* (2006.01)

(52) U.S. Cl.
  CPC .. *G06F 12/0207* (2013.01); *H04B 2001/6912* (2013.01); *H04J 14/02* (2013.01)

(58) Field of Classification Search
  CPC ....... G06F 11/2284; H04J 14/02; H04J 11/00; H04J 11/0026; H04J 2011/0003
  USPC ......................................................... 375/139
  See application file for complete search history.

(56) References Cited

U.S. PATENT DOCUMENTS

| | | | |
|---|---|---|---|
| 2013/0051432 A1* | 2/2013 | Hiscock | H04L 1/0002 375/139 |
| 2014/0064337 A1* | 3/2014 | Hiscock | H04B 1/69 375/139 |
| 2019/0356351 A1* | 11/2019 | Nguyen | H04B 1/69 |
| 2020/0057136 A1* | 2/2020 | Doescher | G01S 13/343 |
| 2020/0292659 A1* | 9/2020 | Bai | G01S 7/023 |

* cited by examiner

SYSTEM AND METHODS FOR GENERATING AND RECEIVING DOPPLER TOLERANT MULTIPURPOSE COMMUNICATION WAVEFORM

REFERENCE TO RELATED APPLICATION

This application is a continuation of U.S. application Ser. No. 16/418,424, filed on May 21, 2019, which claims priority to U.S. Provisional Application No. 62/829,921, filed Apr. 5, 2019, titled "SYSTEM AND METHODS FOR GENERATING AND RECEIVING DOPPLER TOLERANT MULTIPURPOSE COMMUNICATION WAVEFORMS," which is hereby incorporated by reference in its entirety.

FIELD OF THE DISCLOSURE

This disclosure relates to generating and receiving RF signals that can be deployed in congested frequency spaces and are resistant to signal degradation associated with communications between moving objects.

BACKGROUND OF THE DISCLOSURE

The world relies heavily on communications for the exchange of voice, data and media in support of commerce and government. Heavy use of the spectrum has resulted in interference experienced by the presence of other devices operating at the same or nearby frequencies making current technologies fragile. Therefore, there is a continuing need to evolve communication systems so that they are robust and secure even when operating in a congested spectrum.

Communications can often time involve one or more moving objects. As an example, while a transmitter may be stationary, the object it is attempting to communicate with can be moving. In another example, both the transmitter and the object that the transmitter is attempting to communicate with can be moving. If the movement of either the transmitter or receiver or both is great enough, the communications scheme employed between the transmitter and the receiver can be susceptible to negative effects associated with Doppler corruption. The Doppler effect between moving objects can cause frequency shifts in the signal that can cause the receiver to misinterpret the received signals. Thus, in a communications channel in which objects are moving, there can be an evolving need to employ a communications scheme that can mitigate the effects associated with Doppler frequency shifts.

SUMMARY OF THE DISCLOSURE

Accordingly, a methodology for generating a radio frequency (RF) waveform that can robustly operate in a congested spectrum and mitigate the effects associated with Doppler is provided. In one or more examples, a continuous phase frequency modulation scheme can be employed to create short duration frequency swept intervals that can be hopped at ultrafast frequencies. The pattern of the hops can be based on the content of the data, and in one or more examples a specific pattern of hops can be associated with "1" bit in the data, and a second specific pattern of hops can be associated with a "0" bit in the data. Rather than being constant, the frequency of the signal at a specific hop can be either positively or negatively swept to combat the effects of Doppler on the system. The waveform's spectral density and out of band emissions can be precisely controlled to meet the needs of the application, however, in most cases the spectral density will be uniformly distributed so as to appear as white Gaussian noise. The method does not follow conventional chip rate versus bandwidth rules common to spread spectrum technologies, since the hops occur at intervals much shorter than the chip intervals. However, like spread spectrum this methodology produces waveforms having excellent spectral and temporal anti-jam properties.

DETAILED DESCRIPTION

The following description sets forth exemplary methods, parameters, and the like. It should be recognized, however, that such description is not intended as a limitation on the scope of the present disclosure but is instead provided as a description of exemplary embodiments.

In the following description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

In addition, it is also to be understood that the singular forms "a," "an," and "the" used in the following description are intended to include the plural forms as well unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Some portions of the detailed description that follow are presented in terms of algorithms and symbolic representations of operations on data bits within a computer memory.

These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing," "computing," "calculating," "determining," "displaying," or the like refer to the action and processes of a computer system, or similar electronic computing device, that manipulates and transforms data represented as physical (electronic) quantities within the computer system memories or registers or other such information storage, transmission, or display devices.

Certain aspects of the present invention include process steps and instructions described herein in the form of an algorithm. It should be noted that the process steps and instructions of the present invention could be embodied in software, firmware, or hardware, and, when embodied in software, they could be downloaded to reside on, and be operated from, different platforms used by a variety of operating systems.

Frequency hopped communication schemes are frequently employed to allow people to communicate with one another in a frequency congested spectrum. A frequency congested spectrum can occur when there are numerous transmitters and receivers that are operating within the same frequency space, and often in the same geographic space. Instead of having a transmitter communicate with a receiver at a fixed frequency for the duration of the communication, the transmitter can instead "hop around" the spectrum during the communication so as to avoid being "stepped on" i.e., interfered with the communications of another transmitter also communicating at the same or substantially similar frequency. Frequency hopped communications schemes are often referred to as frequency-hopping spread spectrum systems, and they often transmit radio signals to their intended receivers by rapidly switching carrier signals among many frequency channels during the duration of the communications.

In one or more examples a frequency hopping transmitter will switch their frequencies in a pre-determined sequence that is known to both the transmitter and receiver. In this way, the transmitter can hop frequencies so as to avoid being stepped on, and the receiver can continue to receive the communications because it can know the pre-determined sequence and operate accordingly.

Figure 1:
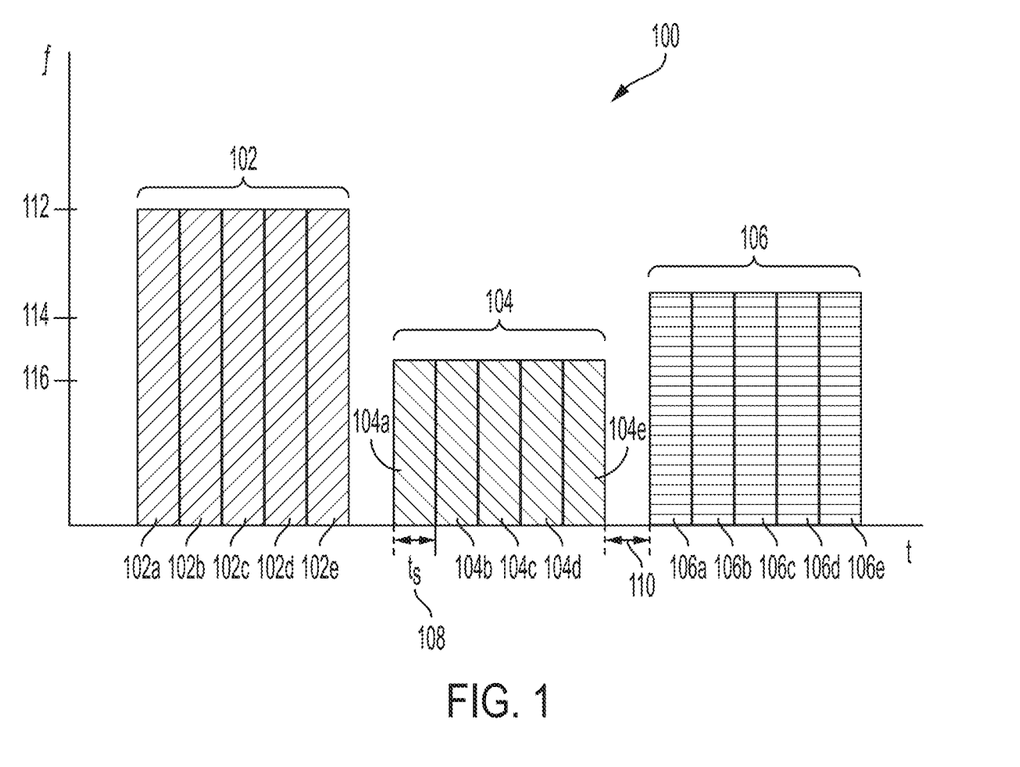
FIG. 1 illustrates an exemplary frequency hopped communications scheme according to examples of the disclosure.

FIG. 1 illustrates an exemplary frequency hopped communications scheme according to examples of the disclosure. In the example of FIG. 1, a signal 100 is transmitted over time using three separate frequencies. In one or more examples, a plurality of symbols (102a-e, 104a-e, and 106a-e) can be transmitted in groups 102, 104, and 106. Each group 102, 104, and 106 can be transmitted during a particular frequency dwell. For instance, all symbols 102a-e associated with group 102 can be transmitted at frequency 112. All symbols 104a-e associated with group 104 can be transmitted at frequency 116. All symbols 106a-e can be transmitted at frequency 114.

Each symbol in a particular group can be phase coded meaning that the receiver can look to the phase of a particular symbol in order to decode the underlying data that the symbol is encoded to represent. For example, symbols 102a-e can each be phase coded with a specific pattern such that a receiver can distinguish the data content of each symbol. During the transmission of data, the transmitter can be set to a carrier frequency of 112, and symbols 102a-e can be transmitted during the frequency dwell with each symbol being phase coded. Next, the transmitter can hop to the next carrier frequency, which in the example of FIG. 1 can be frequency 116. During the dwell at frequency 116, symbols 104a-e can be transmitted. Next the transmitter can change the carrier frequency to 114, and symbols 106a-e can then be transmitted.

Each symbol can be transmitted for a pre-determined duration of time 108. As illustrated in FIG. 1, there can also be a duration of time 110 between frequency dwells wherein no data is transmitted. The duration of time 110 can exist to allow the pulse transmitted by the transmitter at each frequency to settle before the receiver is required to decode the received signal.

While the above system described with respect to FIG. 1 can allow for communications between a receiver and a transmitter in a congested spectrum, given the prevalence of this type of communications scheme, even transmitters and receivers that use the above described method can experience performance degradation. Furthermore, congested spectrums that include transmitters and receivers that operate in the above described manner can make it difficult to add new transmitters and receivers into the frequency spectrum to communicate. In other words, once a particular frequency spectrum is congested, it may not have the ability to allow for more users to operate in the spectrum.

Thus, there is a need for a communications scheme that can operate in a given frequency spectrum but operate in a manner so as to minimize the negative effects associated with congested spectrum. The new communications scheme should expect that there will be interference from other communications in the spectrum. For instance, it is possible that when the new communications scheme is operating at a given frequency, there may be another transmitter in the spectrum that is operating at either the same frequency or a nearby frequency, such that interference can be experienced.

In one or more examples, rather than transmitting a symbol at a constant frequency, the symbol itself can be frequency hopped with a continuous phase. Thus, in contrast to the example of FIG. 1, wherein a symbol is transmitted at a constant frequency, with the symbol being phase encoded, in another exemplary communications scheme, the symbol can be encoded via multiple frequency hops, and the phase can remain continuous.

Figure 2:
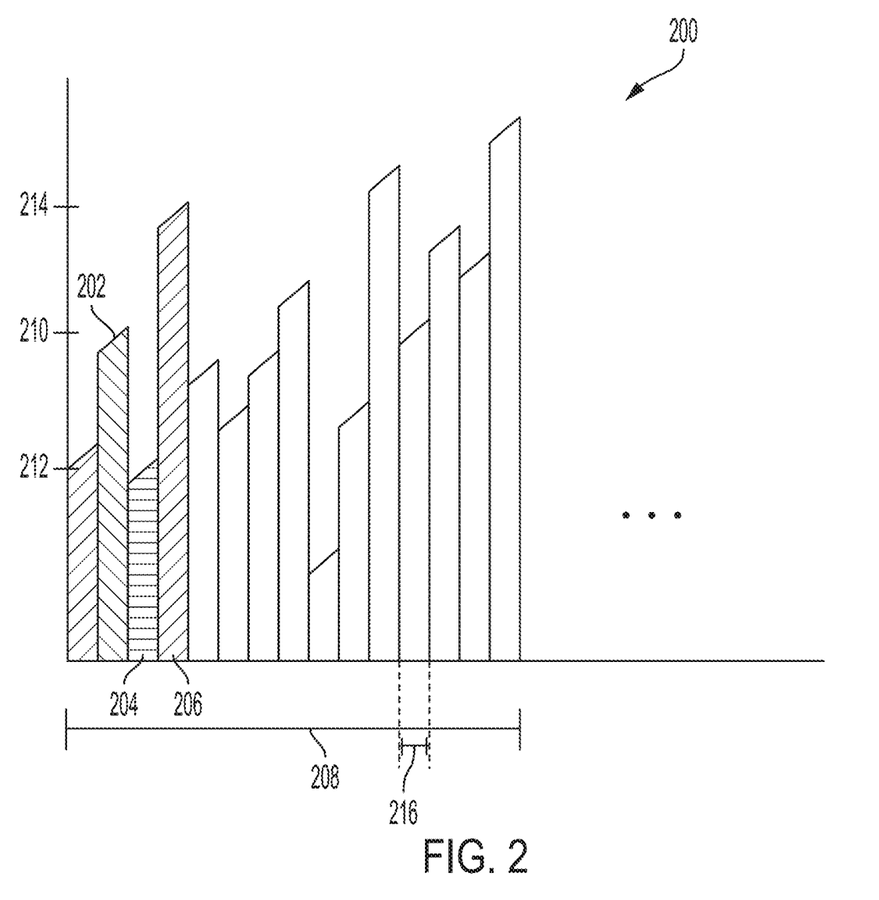
FIG. 2 illustrates an exemplary frequency hopped communications scheme that employs frequency swept chirps according to examples of the disclosure.

FIG. 2 illustrates an exemplary frequency hopped communications scheme that employs frequency swept chirps according to examples of the disclosure. In the example of FIG. 2, the waveform 200 can represent the transmission of a single symbol. In one or more examples, the symbol duration 208 (i.e., the time over which the symbol is transmitted) can be equivalent to the symbol duration 108 described above with respect to FIG. 1. In the example of FIG. 1, a single symbol can be transmitted over time duration 108, wherein the symbol can be transmitted at a single frequency with the phase varying to encode the symbol. However, in the example of FIG. 2, a single symbol can be transmitted over the time duration 208, with the symbol being represented by a plurality of "chirps," wherein the frequency of each chirp is varied during the duration of the symbol so as to encode the symbol in the communications waveform.

In the example of FIG. 2, each chirp (represented as 202, 204, and 206) can be transmitted at a center frequency 210, 212, and 214 respectively. While the specification and examples described below describe a center frequency, the disclosure should be viewed as exemplary and not limiting. A center frequency can also refer to any intermediate frequency with a given frequency sweep range. Each symbol transmitted over a duration 208 can be represented by multiple chirps. Each chirp can be transmitted over a short duration of time 216. The duration 216 of a single chirp can be substantially smaller than the duration of the symbol. In this way, even if there is interference caused by another transmitter in the spectrum during the transmission of a given chirp, the chirp itself may only represent a small part of the symbol and thus the impact of the interference may be mitigated. In other words, by frequently changing frequencies during the transmission of a single symbol, the corruption of a single chirp may not have substantial impact on the decoding of the entire symbol since a single chirp can only represent a small portion of the symbol. Hopping frequency multiple times during the transmission of a single symbol thus can allow for a communications scheme to operate in a congested frequency space by minimizing the impacts of interference at a particular frequency.

In one or more examples each chirp 204, 206, and 208 can be frequency swept during the transmission of the chirp rather than maintaining a constant frequency. Often times communications using schemes described above can occur between transmitters and receiver that are often moving with respect to one another. For instance, a transmitter may be located on a moving vehicle, while the receiver is stationary. Or the receiver may be on a moving vehicle while the transmitter remains stationary. In other examples, both the transmitter and the receiver may be simultaneously moving with respect to one another. In such a scenario, the communications scheme can become susceptible to the Doppler effect.

The Doppler effect can refer to the change in frequency experienced by the waveform in relation to a receiver that is moving relative to the transmitter. When two objects are moving relative to one another, even though the transmitter transmitted the waveform at a particular frequency, the receiver may receive the waveform at a shifted frequency that can be caused by the movement of the receiver relative to the transmitter. This shift in frequency can be problematic for systems that depend on the frequency of a transmission to decode information such as the scheme presented with respect to FIG. 2.

In order to counteract the Doppler effect on the communications scheme presented with respect to FIG. 2, in one or more examples, each chirp can be frequency swept during the duration of the chirp. In one or more examples, frequency sweeping a chirp can refer to linearly (or non-linearly) moving the frequency over the duration of the chirp in either a negative or positive direction. By sweeping the frequency of a particular chirp, even if a frequency shift occurs due to the Doppler effect, the frequency of the chirp can still be in the expected frequency range of the chirp, thus allowing the receiver to decode the symbol.

Thus, in order to counteract the Doppler effect, both the center frequency offsets between consecutive chirps, as well as the total frequency range of an individual chirp can be pre-determined based on the expected Doppler shift in a given application. For instance, in one or more examples the center frequency offsets between consecutive chirps can be pre-selected such that the offset is greater than or equal to one half the total expected Doppler shift ($f_{DopplerMAX}$). In or more examples $f_{DopplerMAX}$ can represent the total expected frequency shift that is expected to occur in a given application of the communications scheme. Thus, in one or more examples, if the expected frequency shift is high (i.e., the transmitter and the receiver are moving at high speeds with respect to one another) then the frequency offset between successive chirps can be high. Thus, even if the Doppler effect shifts the transmitted frequency, the shift will still place the chirp in the expected frequency band, thus allowing the receiver to properly receive the transmitted signal.

In addition to increasing the frequency offset between successive chirps, the total frequency range for a given chirp can also be selected based on the expected Doppler effect. In one or more examples, the total frequency range of a chirp (its bandwidth) must be greater than or equal to the maximum Doppler shift ($f_{DopplerMAX}$) as determined by the application. By setting the frequency range of a particular chirp (i.e., the amount of change in frequency over the time duration of the chirp) based on the maximum expected Doppler effect, even if the Doppler effect shifts the transmitted frequency, the shift will still place the chirp in the expected frequency band, thus allowing the receiver to properly receive the transmitted signal.

Figure 3:
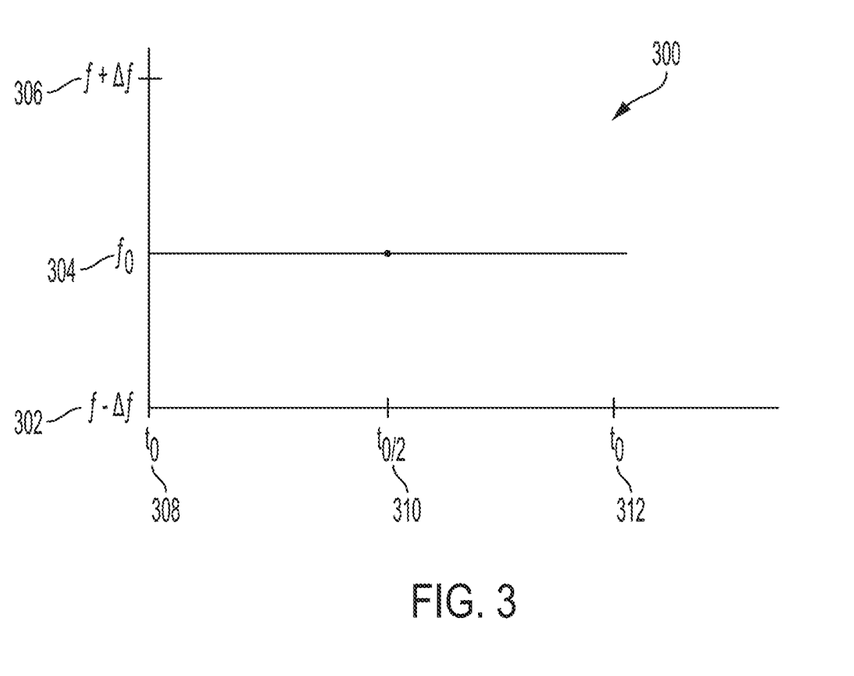
FIG. 3 illustrates an exemplary frequency versus time plot of a single dwell in the communications scheme described with respect to FIG. 1 according to examples of the disclosure.
Figure 4A:
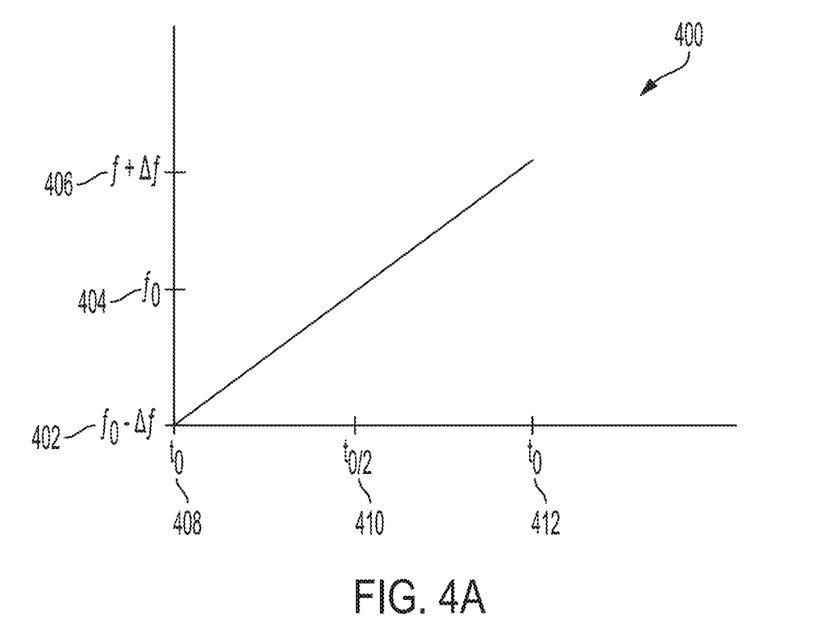
FIGS. 4A and 4B illustrate exemplary frequency versus time plots of a single dwell in the communications scheme described with respect to FIG. 2 according to examples of the disclosure.
Figure 4B:
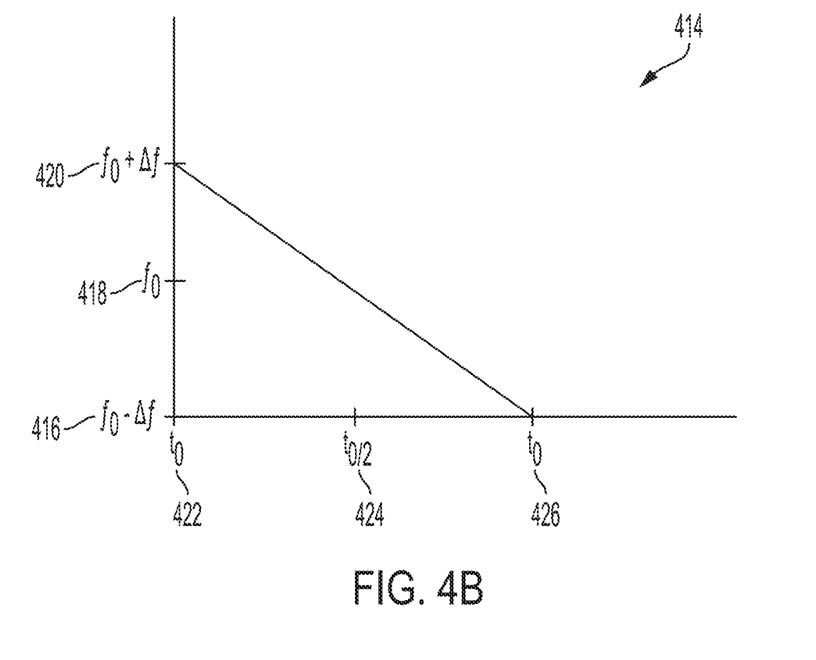

To further illustrate the above principle, frequency versus time plots for the example communications schemes described with respect to FIG. 1 and FIG. 2 are presented in the figures. FIG. 3 illustrates an exemplary frequency versus time plot of a single dwell in the communications scheme described with respect to FIG. 1 according to examples of the disclosure. In the example of FIG. 3, a waveform 300 exhibits a constant frequency versus time. Thus, at an initial time 308, the waveform is set at frequency 304 and remains there at time 310 and 312. The timespan from 308 to 310 to 312 can represent the time it takes to transmit one portion of a symbol. As shown in FIG. 3, the frequency remains constant at 304 and does not vary to frequency 306 and 302 as depicted in the figure. For the communications scheme in FIG. 2, the method illustrated in FIG. 3 can be used when no Doppler shift is anticipated In contrast to the example of FIG. 3, a communications scheme employing the example of FIG. 2 can vary the frequency over a specific duration. FIGS. 4A and 4B illustrate exemplary frequency versus time plots of a single dwell in the communications scheme described with respect to FIG. 2 according to examples of the disclosure. Turning to FIG. 4A, a waveform 400 at time 408 can initially be at frequency 402. At time 410, the frequency of the waveform can increase to 404, and at time 412 the frequency of waveform 400 can increase to 406. The duration of time between time 408 and time 412 can represent the duration of a chirp. Thus, as shown in FIG. 4a, during a single chirp, the frequency of the chirp can be swept from frequency 402 to 406 over the entire duration of the chirp represented by the amount of time of the chirp from 408 to 412.

In the example of FIG. 4A, the frequency 404 (i.e., the value of the frequency at time 410) can represent the "center frequency" of the chirp. In the example of a linear frequency sweep, time 410 can represent approximately the halfway point in time of the transmission of the chirp, while frequency 404 corresponding to time 410 can represent the mid-frequency point in frequency sweep. In the example of a linear sweep, the change in frequency between frequencies 406 and 404 can be substantially equal to the change in frequency between frequencies 402 and 404.

In one or more examples a person designing the waveform 400 can set the change in frequency between 402 and 404 to be approximately one half of the expected Doppler frequency shift as described above. In other words, the width of the chirp can be tuned to the velocity of the object or objects that the transmitter is trying to communicate with. If the width of the chirps is tuned to the velocity of the moving receiver, thus even if there is a shift in the frequency caused by the Doppler effect, a matched filter in the receiver will still recognize the chirp as belonging to a particular frequency and the risk of misinterpreting the frequency of the chirp can be minimized.

As described above, while the frequency of a chirp can be swept over the duration of the time of the chirp, the phase of the chirp must be kept continuous. In one or more examples, not only is the phase within a chirp phase-continuous, but each chirp is phase continuous with its adjacent chirps. As described above, the waveform produced by the method described with respect to FIG. 2 can be frequency-coded, wherein a single symbol can be transmitted as a sequence of phase-continuous sweep intervals (i.e., chirps) having short duration dwell times (i.e., ultra-fast frequency hopping) on the order of 1 microsecond or less. A symbol can be decoded by determining the order of the center frequencies over hundreds or thousands of hops. The number of symbols that comprise an information bit (cypher bit) can be determined by the trade space and the performance required by the end user in their intended application. Each center frequency can also be referred to as a hop frequency, and all the hop frequencies can comprise a hop set. The hop set may be comprised of non-contiguous portions of the RF spectrum to support spectrum allocation and management.

Also, in one or more examples, the frequency 406 of the waveform 400 at the end of the chirp at time 412 can also be selected so that the ending phase of the chirp can correspond with the beginning of the next chirp in the sequence of chirps. In this way, rather than pulsing, the waveform 400 is a continuous wave, and there are no gaps in time between chirps.

In one or more examples, the change in frequency from time 408 to time 412 rather than being linear can also be a non-linear progression. For example, the change in frequency over the duration of time can be exponential.

As briefly described above, the frequency of a chirp can also be decreased during the duration of a chip rather than increased as in the example of FIG. 4A. Turning to FIG. 4B, a waveform 414 at time 422 can initially be at frequency 420. At time 424, the frequency of the waveform can decrease to 418, and at time 426 the frequency of waveform 414 can decrease to 416. The duration of time between time 422 and time 426 can represent the duration of a chirp. Thus, as shown in FIG. 4B, during a single chirp, the frequency of the chirp can be swept from frequency 420 to 416 over the entire duration of the chirp represented by the amount of time of the chirp from 422 to 426.

In the example of FIG. 4B, the frequency 418 (i.e., the value of the frequency at time 424) can represent the "center frequency" of the chirp. In the example of a linear sweep, time 424 can represent approximately the halfway point in time of the transmission of the chirp, while frequency 418 corresponding to time 424 can represent the mid-frequency point in frequency sweep. In the example of a linear sweep, the change in frequency between frequencies 420 and 418 can be substantially equal to the change in frequency between frequencies 416 and 418. Other than being swept in a negative direction during the transmission of a chirp, the properties of the waveform 414 can be substantially similar to the properties of the waveform described above with respect to FIG. 4A.

In one or more examples, so as to increase data rate of the communication scheme described with respect to FIG. 2, provide redundancy, and/or establish independent data channels, multiple orthogonal signals may be transmitted at the same time from the same aperture (i.e., multiplexed). Although the embodiment described above discusses linear frequency modulation, the method (as described above) can be implemented using non-linear frequency modulation waveforms. While Nyquist sampling theorem may be insufficient to characterize the new waveform described above with respect to FIG. 2, the sample rate may need to be high enough to be sufficient to determine the center frequency of each chirp without ambiguity.

Figure 5:
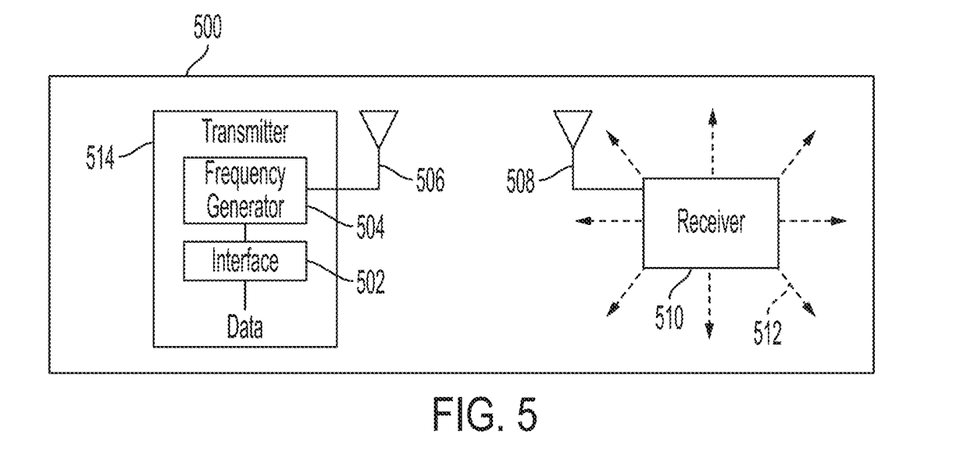
FIG. 5 illustrates an exemplary system for implementing the communications scheme described with respect to FIG. 2 according to examples of the disclosure.

FIG. 5 illustrates an exemplary system for implementing the communications scheme described with respect to FIG. 2 according to examples of the disclosure. In the example of FIG. 500, the system 500 can include a transmitter 514 and a receiver 510. The transmitter 514 can include an interface 502 to pass data to a frequency generator 504. The frequency generator 504 can take the form of a software controlled oscillator driving a digital to analog converter or a direct to digital synthesizer. The frequency generator 504 is connected to one or more antennas 506. In one or more examples, the frequency generator can be configured by a user to emit various sequences of frequency hops based on the data received by the transmitter 514 thereby encoding the data based on the sequence of hops. In one or more examples, data can be received by interface 502, and then the data received can be used by frequency generator 504 to control the hop sequence exhibited by frequency generator 504.

In one or more examples, the interface 502 can provide signals to frequency generator 504 that tell the frequency generator what frequency of signal to provide to antenna 506. Thus, in one or more examples, using the example of FIG. 2, the interface 502 can provide signals to frequency generator 504 to emit a continuous phase signal as illustrated in FIG. 3 or a continuous phase chirp as illustrated in FIG. 4A and FIG. 4B.

In one or more examples, the transmitter 514 can communicate with a receiver 510. The receiver 510 can be coupled to one or more antennas 508 that are configured to receive signals in the frequency range of the signals being emitted by transmitter 514. The receiver 510 can include matched filters that are configured to receive signals in the frequency range of the signals being emitted by transmitter 514. In order to successfully receive a signal, the receiver 510 can include various components that allow the receiver to store information about the communications scheme such as the possible frequencies that could be transmitted by the transmitter, the precise order of the frequency hops for each symbol transmitted by the transmitter 514, the duration in time for each chirp emitted by the transmitter 514, and the parameters of the chirp frequency sweep. Successful detection of the signal can yield a series of bits comprising symbols, which can be output by the receiver 510.

As discussed above, receiver 510 can move its position in three-dimensional space as indicated by the directional arrows 512 with respect to transmitter 514. The movement of the receiver 510 vis-à-vis the transmitter 514 can cause the Doppler effect described above and can be the cause of the need to sweep the frequency of the signal during each chirp transmitted by transmitter 514.

Figure 6A:
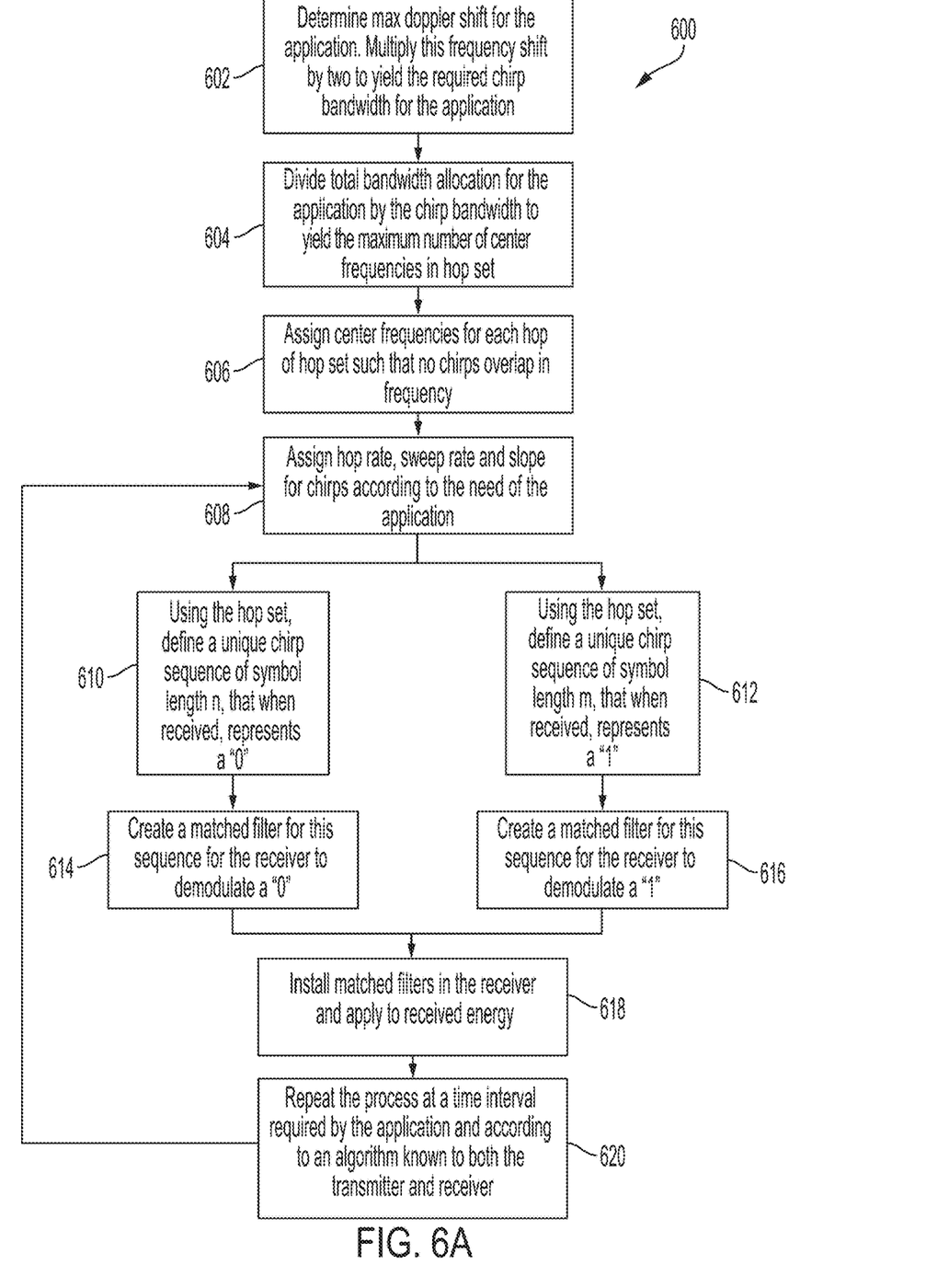
FIG. 6A illustrates an exemplary method of generating one or more sequences of chirps to transmit and receive data.

FIG. 6A illustrates an exemplary method of generating one or more sequences of chirps to transmit and receive data. The process 600 outlined in FIG. 6A can be used to configure the device described above with respect to FIG. 5. In the example of FIG. 6A, the process 600 can begin at step 602 by determining the maximum doppler shift (as discussed above) and deriving the required chirp bandwidth for the application. In one or more examples, deriving the required chirp bandwidth can be achieved by multiplying the calculated maximum doppler shift by two to yield the corresponding required chirp bandwidth for the application. However, in alternative embodiments, the max doppler shift can be multiplied by a different factor to yield the required chirp bandwidth.

Once the maximum doppler shift and the required chirp bandwidth are calculated at step 602, the process can move to step 604 wherein the maximum number of center frequencies for a hop set can be calculated. In one or more examples, the total bandwidth allocation for the application can be then divided by the chirp bandwidth to yield the maximum number of chirp center frequencies in the hop set. The process of step 604 can be used to ensure that a chirp sequence does not exceed the bandwidth allocated to a particular application.

Once the number of hop frequencies is determined at step 604, the process can move to step 606, wherein center frequencies are assigned such that for each hop in the hop set, no chirps overlap in frequency and the maximum number of center frequencies is not exceeded. The choice of center frequencies can be made such that each hop occupies a frequency space that is mutually exclusive to the other hops in a given hop set.

Once the center frequencies have been assigned at step 606, the process can move to step 608 wherein, the hop rate, sweep rate for the chirps, and slope of each chirp (positive or negative) can be selected in step 608 according to the need of the application. The process at step 608 can thus yield a usable hop set, that can be utilized to transmit data without interference and it is configured based on the needs of the application wanting to transmit data.

Once the hop rate, sweep rate, and slope have been assigned at step 608, the process can move to step 610 and 612, wherein the hop set generated in step 608 can be used to define a unique chirp sequence of symbol length n, that when received, represents a "0" and "1" respectively (as described above). The process outlined above with respect to steps 602-612 can be used to define the transmitter and configure it. Once the transmitter has been configured and defined, the corresponding receiver can be similarly defined to receive the chirp sequences configured in the steps above.

Thus, once the transmitter has been configured according to steps 602-612 as described above, the process can move to steps 614 and 616, wherein a matched filter is created in the receiver for the sequences generated in steps 610 and 612 respectively that, when implemented in the receiver, allows the receiver to demodulate sequences of chirps to yield either a "0" or a "1".

Once the matched filters have been created at steps 614 and 616, the process can move to step 618, wherein the matched filters are installed in the receiver which can then be applied to energy received by the receiver to demodulate the desired signal.

Finally, once the receiver has been configured at step 618, the process can move to step 620, wherein the process of generating new chirp sequences representing a "0" and a "1" can be repeated. These new sequences can be computed in advance and stored in both the transmitter and the receiver or computed in real time according to an algorithm known to both the transmitter and the receiver. The time delay before repeating this process can be known to both the receiver and the transmitter and can be determined by the need of the application.

Figure 6B:
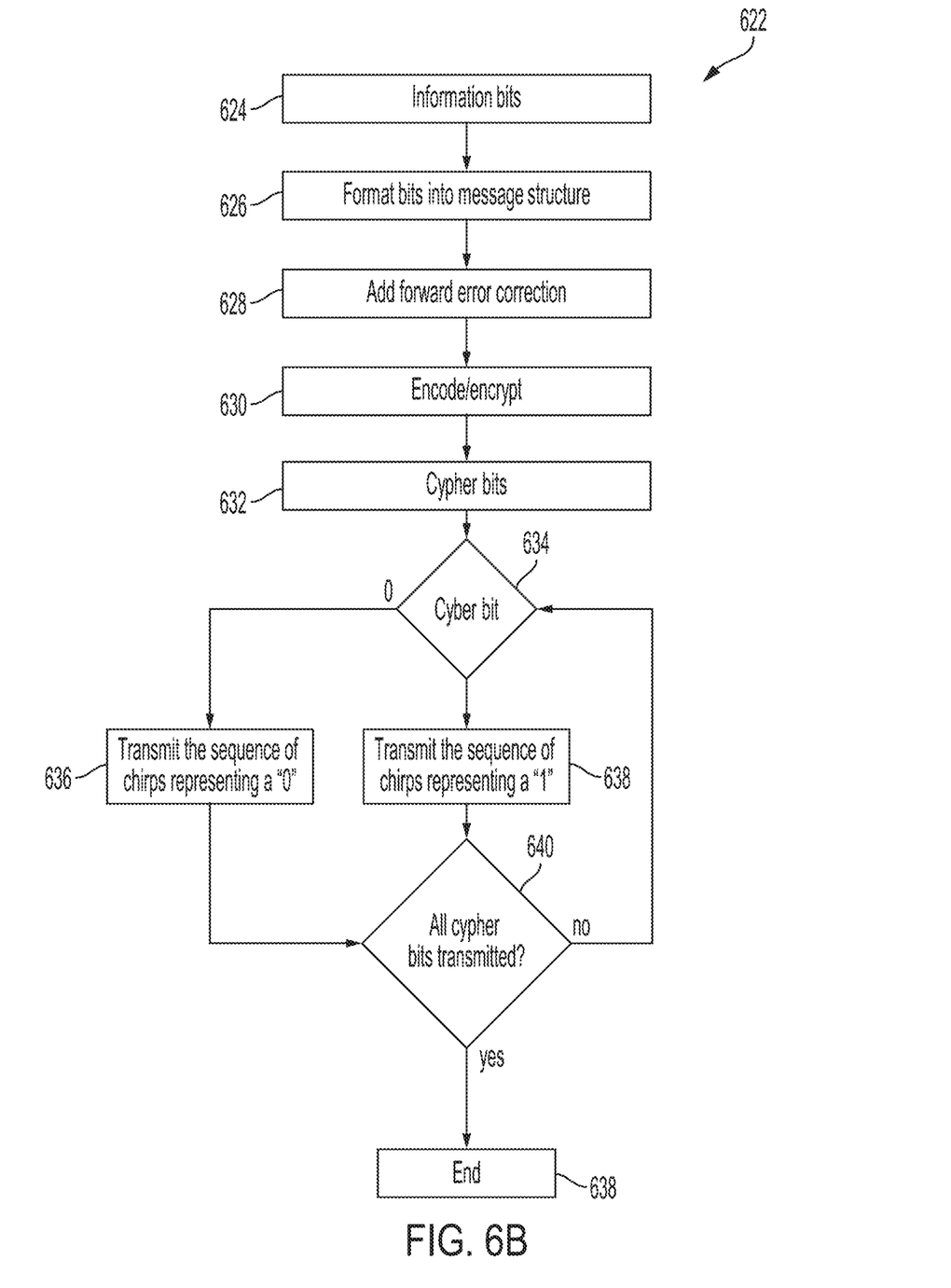
FIG. 6B illustrates an exemplary method of operating the system described with respect to FIG. 5 according to examples of the disclosure.

FIG. 6B illustrates an exemplary method of operating the system described with respect to FIG. 5 according to examples of the disclosure. In the example of FIG. 6B, the process 622 can begin at step 624 wherein one or more information bits is received by the transmitter and is to be encoded for transmission to a receiver. Once the one or more bits are received at step 624, the process can move to step 626 wherein the bits are formatted into a message structure, a predetermined time-sequential arrangement of the parts of a message that is to be transmitted, followed by step 628 wherein forward error correction is applied to the message structure to provide additional protection of the information from channel errors. In step 630, the resulting message is then encoded or encrypted according to a method determined by the application to yield cypher bits in step 632.

In step 634, each cypher bit can be examined and determined to be a "0" or a "1". When the cyber bit is determined to be a "0", the process can move to step 636 wherein the transmitter can transmit the sequence of chirps representing a "0" that was defined in step 610 outlined in FIG. 6A. Otherwise, the cypher bit can be determined to be a "1", and the process can move to step 638 where the transmitter transmits the sequence of chirps representing a "1" that was defined in step 612.

At step 640, a determination can be made as to whether all cypher bits received at step 632 have been transmitted to the receiver. If not, then the process can revert back to step 634 wherein a new sequence of chirps is determined based on the next cypher bit that has yet to be transmitted. However, if all cypher bits received at step 632 have been transmitted, the process can move to step 642 wherein the process is terminated.

Figure 7:
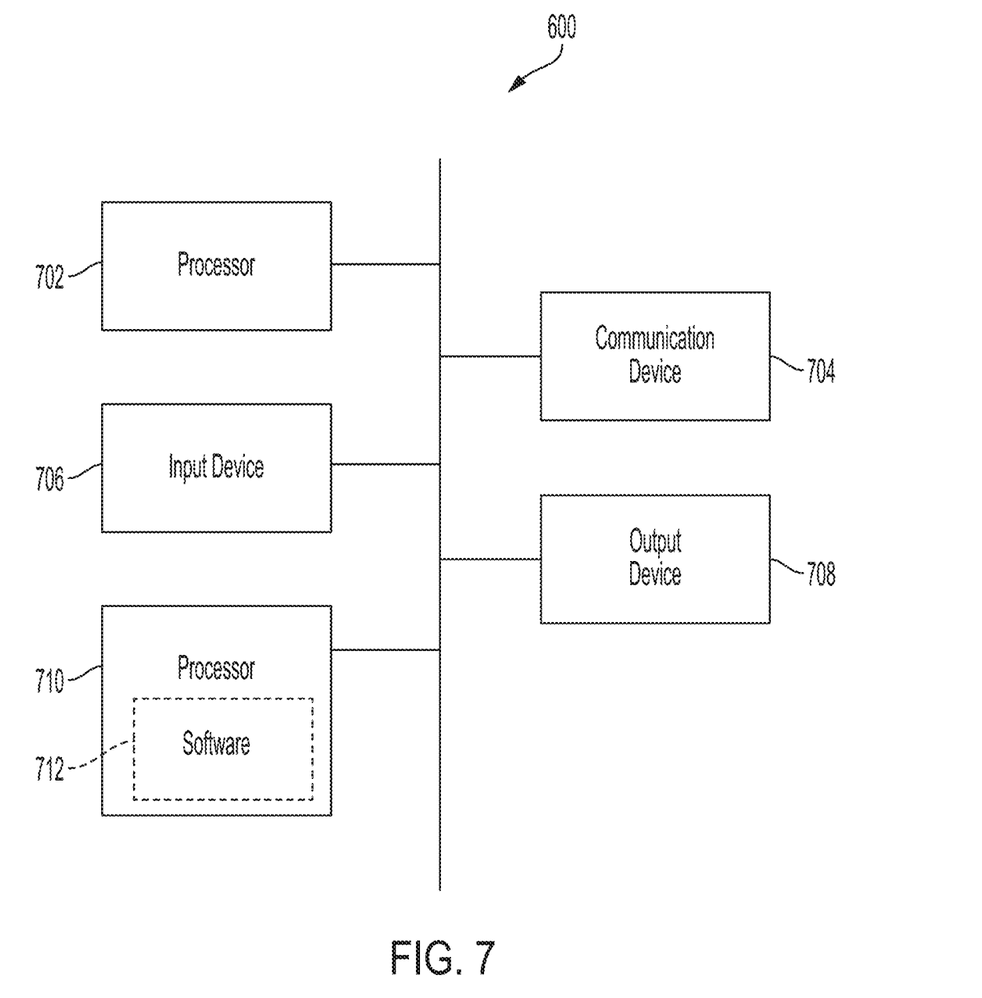
FIG. 7 illustrates an example of a computing device in accordance with one embodiment of the disclosure.

FIG. 7 illustrates an example of a computing device in accordance with one embodiment. Device 700 can be a host computer connected to a network. Device 700 can be a client computer or a server. As shown in FIG. 7, device 700 can be any suitable type of microprocessor-based device, such as a personal computer, work station, server, or handheld computing device (portable electronic device) such as a phone or tablet. The device can include, for example, one or more of processor 710, input device 720, output device 730, storage 740, and communication device 760. Input device 720 and output device 730 can generally correspond to those described above and can either be connectable or integrated with the computer.

Input device 720 can be any suitable device that provides input, such as a touchscreen, keyboard or keypad, mouse, or voice-recognition device. Output device 730 can be any suitable device that provides output, such as a touchscreen, haptics device, or speaker.

Storage 740 can be any suitable device that provides storage, such as an electrical, magnetic, or optical memory including a RAM, cache, hard drive, or removable storage disk. Communication device 760 can include any suitable device capable of transmitting and receiving signals over a network, such as a network interface chip or device. The components of the computer can be connected in any suitable manner, such as via a physical bus, or wirelessly.

Software 750, which can be stored in storage 740 and executed by processor 710, can include, for example, the programming that embodies the functionality of the present disclosure (e.g., as embodied in the devices described above).

Software 750 can also be stored and/or transported within any non-transitory, computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 740, that can contain or store programming for use by or in connection with an instruction-execution system, apparatus, or device.

Software 750 can also be propagated within any transport medium for use by or in connection with an instruction-execution system, apparatus, or device, such as those described above, that can fetch instructions associated with the software from the instruction-execution system, apparatus, or device and execute the instructions. In the context of this disclosure, a transport medium can be any medium that can communicate, propagate, or transport programming for use by or in connection with an instruction-execution system, apparatus, or device. The transport readable medium can include, but is not limited to, an electronic, magnetic, optical, electromagnetic, or infrared wired or wireless propagation medium.

Device 700 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 700 can implement any operating system suitable for operating on the network. Software 750 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for purpose of explanation, has made reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments, with various modifications, that are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed is:

1. A method for communicating between a transmitter and a receiver, wherein the receiver is moving with respect to the transmitter, and wherein the method comprises:
   receiving one or more symbols;
   determining a chirp bandwidth based on an expected maximum Doppler frequency shift between the receiver and the transmitter;
   determining a plurality of center frequencies based on the determined chirp bandwidth;
   generating a sequence of chirps, wherein the sequence of chirps comprises a plurality of chirps, and wherein the sequence of chirps is based on the determined chirp bandwidth, the plurality of center frequencies, and the first symbol; and
   transmitting the sequence of chirps.

2. The method of claim 1, wherein a center frequency offset between two or more consecutive chirps of the plurality of chirps in the sequence of chirps is determined based on the expected maximum Doppler shift.

3. The method of claim 2, wherein the center frequency offset is at least equal to one half of the expected maximum Doppler shift.

4. The method of claim 1, wherein the chirp bandwidth is at least equal to the expected maximum Doppler shift.

5. The method of claim 1, wherein the plurality of center frequencies are assigned to the sequence of chirps such that each chirp of the plurality of chirps occupies a frequency space that is mutually exclusive to a frequency space of other chirps in the sequence of chirps.

6. The method of claim 1, wherein a frequency sweep across the chirp bandwidth is required for one or more chirps in the sequence of chirps in transmitting the sequence of chirps.

7. The method of claim 1, wherein each chirp has continuous phase throughout a time duration of each chirp.

8. The method of claim 7, wherein the phase of each chirp is continuous throughout the sequence of chirps.

9. A system for communicating waveforms between a transmitter and a receiver, wherein the receiver is moving with respect to the transmitter, wherein the system comprises:
   a memory;
   one or more processors; and
   wherein the memory stores one or more programs that when executed by the one or more processors, cause the one or more processors to:
   receive one or more symbols;
   determine a chirp bandwidth based on an expected maximum Doppler frequency shift between the receiver and the transmitter;
   determine a plurality of center frequencies based on the determined chirp bandwidth;
   generate a sequence of chirps, wherein the sequence of chirps comprises a plurality of chirps, and wherein the sequence of chirps is based on the determined chirp bandwidth, the plurality of center frequencies, and the first symbol; and
   transmit the sequence of chirps.

10. The system of claim 9, wherein a center frequency offset between two or more consecutive chirps of the plurality of chirps in the sequence of chirps is determined based on the expected maximum Doppler shift.

11. The system of claim 10, wherein the center frequency offset is at least equal to one half of the expected maximum Doppler shift.

12. The system of claim 9, wherein the chirp bandwidth is at least equal to the expected maximum Doppler shift.

13. The system of claim 9, wherein the center frequencies are assigned to the sequence of chirps such that each chirp occupies a frequency space which is mutually exclusive to the frequency space of other chirps in the sequence of chirps.

14. The system of claim 9, wherein a frequency sweep across the chirp bandwidth is required for one or more chirps in the sequence of chirps in transmitting the sequence of chirps to the receiver.

15. The system of claim 9, wherein each chirp has continuous phase throughout a time duration of each chirp.

16. The system of claim 14, wherein the phase of each chirp is continuous throughout the sequence of chirps.

17. A non-transitory computer-readable storage medium storing one or more programs for communicating between a transmitter and a receiver implemented at the transmitter, the programs for execution by one or more processors of an electronic device that when executed by the device, cause the device to:
receive one or more symbols;
determine a chirp bandwidth based on an expected maximum Doppler frequency shift between the receiver and the transmitter;
determine a plurality of center frequencies based on the determined chirp bandwidth;
generate a sequence of chirps, wherein the sequence of chirps comprises a plurality of chirps, and wherein the sequence of chirps is based on the determined chirp bandwidth, the plurality of center frequencies, and the first symbol; and
transmit the sequence of chirps.

18. The non-transitory computer-readable storage medium of claim 17, wherein a center frequency offset between two or more consecutive chirps of the plurality of chirps in the sequence of chirps is determined based on the expected maximum Doppler shift.

19. The non-transitory computer-readable storage medium of claim 18, wherein the center frequency offset is at least equal to one half of the expected maximum Doppler shift.

20. The non-transitory computer-readable storage medium of claim 17, wherein the chirp bandwidth is at least equal to the expected maximum Doppler shift.

21. The non-transitory computer-readable storage medium of claim 17, wherein the plurality of center frequencies are assigned to the sequence of chirps such that each chirp of the plurality of chirps occupies a frequency space that is mutually exclusive to a frequency space of other chirps in the sequence of chirps.

22. The non-transitory computer-readable storage medium of claim 17, wherein a frequency sweep across the chirp bandwidth is required for one or more chirps in the sequence of chirps in transmitting the sequence of chirps.

23. The non-transitory computer-readable storage medium of claim 17, wherein each chirp has continuous phase throughout a time duration of each chirp.

24. The non-transitory computer-readable storage medium of claim 22, wherein the phase of each chirp is continuous throughout the sequence of chirps.

* * * * *